(12) United States Patent
Sherman

(10) Patent No.: US 12,002,129 B1
(45) Date of Patent: Jun. 4, 2024

(54) SYSTEMS AND METHODS OF GENERATING A DISPLAY DATA STRUCTURE FROM AN INPUT SIGNAL

(71) Applicant: Sherman IP, LLC, Coeur D'Alene, ID (US)

(72) Inventor: William Sherman, Coeur D'Alene, ID (US)

(73) Assignee: Sherman IP, LLC, Coeur D'Alene, ID (US)

(*) Notice: Subject to any disclaimer, the term of this patent is extended or adjusted under 35 U.S.C. 154(b) by 0 days.

(21) Appl. No.: 18/403,213

(22) Filed: Jan. 3, 2024

(51) Int. Cl.
*G06T 11/00* (2006.01)
*G06F 3/14* (2006.01)
*G06F 18/10* (2023.01)

(52) U.S. Cl.
CPC .............. *G06T 11/001* (2013.01); *G06F 3/14* (2013.01); *G06F 18/10* (2023.01)

(58) Field of Classification Search
CPC ........ G06T 11/001; G06T 11/206; G06F 3/14; G06F 18/10
See application file for complete search history.

(56) References Cited

U.S. PATENT DOCUMENTS

| | | | |
|---|---|---|---|
| 11,556,992 B2 | 1/2023 | Nguyen | |
| 11,663,668 B1 | 5/2023 | Bloom | |
| 2011/0028856 A1* | 2/2011 | Zhang | A61B 5/746 600/515 |
| 2015/0216762 A1* | 8/2015 | Oohashi | A61M 21/02 601/47 |
| 2016/0196610 A1 | 7/2016 | Eastwood | |
| 2021/0342691 A1* | 11/2021 | Lui | G06N 3/045 |
| 2022/0164883 A1* | 5/2022 | Schneider | G06Q 40/04 |
| 2023/0206058 A1 | 6/2023 | Wellmann | |

OTHER PUBLICATIONS

Huanze Tang, Stock Prices Prediction Based on ARMA Model, 2021, IEEE, 2021 International Conference on Computer, Blockchain and Financial Development (CBFD), pp. 201-204. (Year: 2021).*

* cited by examiner

*Primary Examiner* — Jeffery A Brier
(74) *Attorney, Agent, or Firm* — Caldwell Intellectual Property Law

(57) ABSTRACT

An apparatus and method for an apparatus for generating a display data structure from an input signal. The apparatus includes at least a processor and a memory communicatively connected to the at least a processor, wherein the memory contains instructions configuring the at least a processor to receive an input signal, apply a momentum processing module to the input signal, receive at least one directional momentum signal for the at least a time series from the momentum processing module, apply an autoregressive signal processing module to the at least one directional momentum signal to determine at least one filtered momentum, generate a display data structure using the at least one filtered momentum signal and a plurality of threshold values, and transmit the display data structure to a remote device, wherein the display data structure is configured to cause the remote device to display the dynamic vector.

20 Claims, 10 Drawing Sheets

| Timeframe | PDAV | Last PDAV Change |
|---|---|---|
| Short-Term | Negative | Date A |
| Medium-Term | Positive | Date B |
| Long-Term | Positive | Date C |

| Number of Current Positive PDAVs | Dynamic Vector | Total Days 704 | Percent Total Days | Index Annualized Return | Maximum Drawdown |
|---|---|---|---|---|---|
| 0 | Negative | Total A | Percent A | Return A | Drawdown A |
| 1 or 2 | Neutral | Total B | Percent B | Return B | Drawdown B |
| 3 | Positive | Total C | Percent C | Return C | Drawdown C |
|  | Total | Total D |  |  |  |

SYSTEMS AND METHODS OF GENERATING A DISPLAY DATA STRUCTURE FROM AN INPUT SIGNAL

FIELD OF THE INVENTION

The present invention generally relates to the field of signal processing. In particular, the present invention is directed to systems and methods of generating a generating a display data structure from an input signal.

BACKGROUND

Nonstationary processes are notoriously difficult to analyze due to their unstable statistical properties. A way of processing nonstationary processes such that conclusions regarding the process can be drawn and displayed is needed.

SUMMARY OF THE DISCLOSURE

In an aspect, an apparatus for generating a display data structure from an input signal. The apparatus includes at least a processor and a memory communicatively connected to the at least a processor, wherein the memory contains instructions configuring the at least a processor to receive an input signal, wherein the input signal includes at least a time-series sequence. The memory containing instructions configuring the processor to apply a momentum processing module to the input signal. The memory containing instructions configuring the processor to receive at least one directional momentum signal for the at least a time series from the momentum processing module. The memory containing instructions configuring the processor to apply an autoregressive signal processing module to the at least one directional momentum signal, wherein the autoregressive signal processing module is configured to receive the at least one directional momentum signal and a temporal coefficient and determine at least one filtered momentum signal as a function of the at least one directional momentum signal and the temporal coefficient. The memory containing instructions configuring the processor to generate a display data structure using the at least one filtered momentum signal and a plurality of threshold values, wherein generating the display data structure includes forming a dynamic vector using the at least one filtered momentum signal and a plurality of threshold values. The memory containing instructions configuring the processor to transmit the display data structure to a remote device, wherein the display data structure is configured to cause the remote device to display the dynamic vector.

In another aspect, A method of generating a display data structure from an input signal is described. The method includes receiving, by at least a processor, an input signal, wherein the input signal includes at least a time-series sequence. The method further includes applying, by the at least a processor, a momentum processing module to the input signal. The method further includes receiving, by the at least a processor, at least one directional momentum signal for the at least a time series from the momentum filter. The method further includes applying, by the at least a processor, an autoregressive signal processing module to the at least one directional momentum signal, wherein applying the autoregressive signal processing module includes receiving the at least one directional momentum signal and a temporal coefficient and determining at least one filtered momentum signal as a function of the at least one directional momentum signal and the temporal coefficient. The method further includes generating, by the at least a processor, a display data structure using the at least one filtered momentum signal and a plurality of threshold values, wherein generating the display data structure includes forming a dynamic vector using the at least one filtered momentum signal and a plurality of threshold values. The method further includes transmitting, by the at least a processor, the display data structure to a remote device, wherein the display data structure is configured to cause the remote device to display the dynamic vector.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a diagram depicting an exemplary display element;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a generating a display data structure from an input signal. A computing device may receive an input signal input source. A momentum processing module may be applied to input signal to generate a directional momentum signal. An autoregressive signal processing module may determine a filtered directional momentum signal from the directional momentum signal. A display data structure including a dynamic vector may be created using the filtered directional momentum signal.

Figure 1:
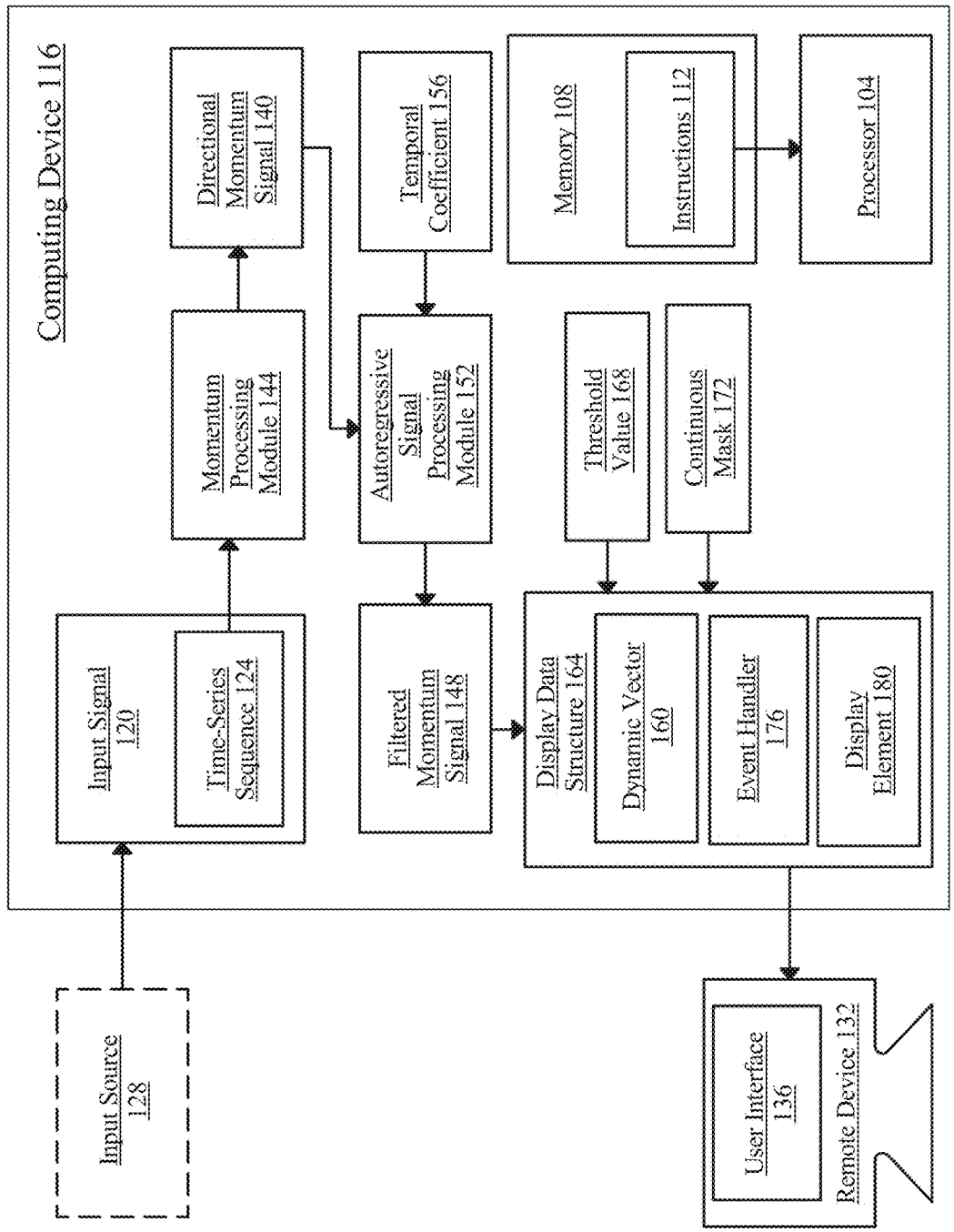
FIG. 1 is a diagram depicting an exemplary apparatus for generating a generating a display data structure from an input signal.

Referring now to FIG. 1, an exemplary embodiment of an apparatus 100 for generating a display data structure from an input signal is illustrated. Apparatus 100 may include a computing device. Apparatus 100 may include a processor.

Processor 104 may include, without limitation, any processor 104 described in this disclosure. Processor 104 may be included in a computing device 116. Computing device 116 may include any computing device 116 as described in this disclosure, including without limitation a microcontroller, microprocessor 104, digital signal processor 104 (DSP) and/or system on a chip (SoC) as described in this disclosure. Computing device 116 may include, be included in, and/or communicate with a mobile device such as a mobile telephone or smartphone. Computing device 116 may include a single computing device 116 operating independently, or may include two or more computing device 116 operating in concert, in parallel, sequentially or the like; two or more computing device 116s may be included together in a single computing device 116 or in two or more computing device 116s. Computing device 116 may interface or communicate with one or more additional devices as described below in further detail via a network interface device. Network interface device may be utilized for connecting computing device 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices 116, and any combinations thereof. A network may employ a wired and/or a wireless mode of communication. In general, any network topology may be used. Information (e.g., data, software etc.) may be communicated to and/or from a computer and/or a computing device 116. Computing device 116 may include but is not limited to, for example, a computing device 116 or cluster of computing devices 116 in a first location and a second computing device 116 or cluster of computing devices 116 in a second location. Computing device 116 may include one or more computing devices 116 dedicated to data storage, security, distribution of traffic for load balancing, and the like. Computing device 116 may distribute one or more computing tasks as described below across a plurality of computing devices 116 of computing device 116, which may operate in parallel, in series, redundantly, or in any other manner used for distribution of tasks or memory between computing devices 116. Computing device 116 may be implemented, as a non-limiting example, using a "shared nothing" architecture.

With continued reference to FIG. 1, computing device 116 may be designed and/or configured to perform any method, method step, or sequence of method steps in any embodiment described in this disclosure, in any order and with any degree of repetition. For instance, computing device 116 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 116 may perform any step or sequence of steps as described in this disclosure in parallel, such as simultaneously and/or substantially simultaneously performing a step two or more times using two or more parallel threads, processor 104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices 116 including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may receive a input signal 120 including a plurality of time-series sequences 124. In some embodiments, input signal may include an unstable process. As used herein, a "time-series sequence" is a plurality of data points indicating a value at multiple points in time. For the purposes of this disclosure, an "input signal," is a signal that is received into an electronic system. In some embodiments, a time-series sequence may include a pecuniary sequence. In some embodiments, a time-series sequence may include other sequence types such as sequences of popularity ratings over time, sequences of viewership ratings over time, and the like. As used herein, a "pecuniary sequence" is a series of data points that track a financial value over time. A pecuniary sequence may track, in non-limiting examples, a value of an equity, an item of debt such as a bond, a market cap, a value of a market, a value of a commodity, a value of a cryptocurrency, a value of a future interest, a financial instrument that tracks another value such as a market, and the like. Input signal 120 may include one time-series sequence 124. Input signal 120 may include a plurality of time-series sequences 124. For example, input signal 120 may include time-series sequences 124 within a particular category. Categories of time-series sequences include, in non-limiting examples, type (such as equity or debt), nationality, which exchange a time-series sequence is traded on, any relevant index that tracks financial instruments such as stocks, a year investment into a time-series sequence became available, and the like. In some embodiments, input signal 120 may include each time-series sequence 124 in a category. In non-limiting examples, input signal 120 may include time-series sequences 124 for each entity whose equity makes up the Dow Jones Industrial Average, or for each entity whose equity is traded on the New York Stock Exchange.

As used in this disclosure, a "signal" is any intelligible representation of data, for example from one device to another. A signal may include an optical signal, an electric signal, a digital signal, an analog signal, and the like. In some cases, a signal may be used to communicate with a computing device, for example by way of one or more ports. In some cases, a signal may be transmitted and/or received by a computing device for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some cases, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, input signal 120 may be received from input source 128. Input source 128 may include, in non-limiting examples, memory 112, a database, a computing device associated with a database, and a financial institution that publishes financial data updates. In a non-limiting example, a financial institution may operate an application programming interface (API) and computing device 116 may request input signal 120 from the financial institution using the API. In some embodiments, computing device 116 may store input signal 120 locally. In some embodiments, computing device 116 may store input signal 120 locally and may request and/or receive replacement input signals 120 and/or updates to input signal 120 from input source 128.

Still referring to FIG. 1, apparatus 100 may request input signal 120 from input source 128 as a function of user inputs. In a non-limiting example, a user using remote device 132 may initiate a process described herein through an input into user interface 136. In this example, computing device 116 may request input signal 120 from input source 128 upon receiving a signal from remote device 132 initiating a process described herein. In a non-limiting example, a user input may include pressing a refresh button meant to update data displayed to a user. In some embodiments, a process described herein is performed in real time.

Still referring to FIG. 1, apparatus 100 may determine a directional momentum signal 140 as a function of one or more time-series sequences 124. As used herein, a "directional momentum signal" for the purposes of this disclosure, is a signal comprising information on the rate of change of a value.

With continued reference to FIG. 1, processor 104 may be configured to apply a momentum processing module 144 to input signal 120. A "momentum processing module," for the purposes of this disclosure is a module that calculates a directional momentum signal. In some embodiments, directional momentum signal 140 may include a momentum oscillator.

With continued reference to FIG. 1, momentum processing module 144 may include a momentum filter. A "momentum filter," for the purposes of this disclosure, is a filter that is configured to covert an input signal into a momentum signal.

With continued reference to FIG. 1, processor 104 may receive at least one directional momentum signal 140 for at least a time-series sequence 124 from momentum processing module 144. In some embodiments, time-series sequence 124 may be fed as input into momentum processing module 144 and directional momentum signal 140 may be received as output.

With continued reference to FIG. 1, momentum processing module 144 may apply a relative strength index to input signal 120 to determine directional momentum signal 140. In some embodiments, this may be done using a momentum filter, such as a relative strength index filter. A "relative strength index," for the purposes of this disclosure, is an index that evaluates the speed and magnitude of value changes. Relative strength index may be calculated using the following formula:

$$RSI = 100 - \frac{100}{1 + \frac{\text{average gain}}{\text{average loss}}}$$

Average gain and average loss may be calculated using a look-back period. For example, average gain may look at the sum of gains over the past look-back period. For example, average loss may look at the sum of losses over the past look-back period. In some embodiments, the look back period may be greater than 1 day. In some embodiments, the look back period may be greater than 2 days. In some embodiments, the look back period may be 1-20 days. In some embodiments, the look back period may be 2-10 days. In some embodiments, the lookback period may be 2 days. In some embodiments, momentum processing module 144 may apply a chande momentum oscillator formula to input signal 120 to determine directional momentum signal 140. In some embodiments, momentum processing module 144 may apply a stochastic oscillator formula to input signal 120 to determine directional momentum signal 140. In some embodiments, momentum processing module 144 may apply a vortex indicator formula to input signal 120 to determine directional momentum signal 140. In some embodiments, momentum processing module 144 may apply an aroon oscillator formula to input signal 120 to determine directional momentum signal 140. In some embodiments, momentum processing module 144 may apply a Williams % Range formula to input signal 120 to determine directional momentum signal 140.

Still referring to FIG. 1, in some embodiments, one or more data smoothing techniques may be applied to time-series sequence 124 in order to produce directional momentum signal 140. In some embodiments, data smoothing techniques may be applied to directional momentum signals 140. Non-limiting examples of data smoothing methods include the randomization method, using a random walk, calculating a moving average, or using an exponential smoothing technique such as using an exponential moving average. A random walk method assumes that future values will be equal to the last available data point plus a random variable. Outliers may also be removed. Applying data smoothing techniques may limit variation when determining a directional momentum signal. This may produce more accurate data on average. For example, if data is highly varied, then taking an average of many data points may produce a better result than taking the value at a specific point, especially if that point lands on a peak or in a trough. In some embodiments, different data smoothing techniques may be applied to different time-series sequences 124, directional momentum signals 140, and/or segments of time-series sequences and directional momentum signals. In some embodiments, data smoothing techniques applied to different time-series sequences 124, directional momentum signals 140, and/or segments of time-series sequences and directional momentum signals may have different parameters. For example, short term, medium term, and long term dynamic vectors may be calculated based on data smoothed using a moving average. In this example, a long term dynamic vector may be calculated using a moving average that smooths data over a larger time span than a time span used to smooth data in order to calculate a short term dynamic vector.

With continued reference to FIG. 1, processor 104 may be configured to determine a filtered momentum signal 148. A "filtered momentum signal," for the purposes of this disclosure, is a momentum signal that has been fed through a filter in order to make the signal more useful for an intended purpose. Processor 104 is configured to apply an autoregressive signal processing module 152 to at least one directional momentum signal 140. An "autoregressive signal processing module," is a module that is configured to process a signal using an autoregression method. In some embodiments, autoregressive signal processing module 152 may include an autoregressive filter. An "autoregressive filter," for the purposes of this disclosure, is a filter whose current output depends on past values of the output. In some embodiments, autoregressive filter may include an infinite impulse response filter. For example, autoregressive filter may apply an autoregressive formula, such as:

$$FN_N = C_1 * FN_1 \pm C_2 * FN_2 \pm C_3 * FN_3 \pm \ldots + C_{N-1} FN_{N-1}$$

In some embodiments, the autoregressive filter may include the calculation of an exponential moving average (EMA). An EMA be calculated using a formula of:

$$EMA_N = \text{Value}(t) * k + EMA_{N-1} * (1-k)$$

Where k is:

$$k = \frac{2}{P+1}$$

P is the period of the EMA.

With continued reference to FIG. 1, as a non-limiting example, period may be anywhere from 12 hours to 180 days. As a non-limiting example, period may be anywhere from 2 days to 90 days. As a non-limiting example, period may be anywhere from 2 days to 90 days. As a non-limiting example, period may be anywhere from 30 days to 90 days. As a non-limiting example, period may be anywhere from 60 days to 90 days. As a non-limiting example, period may be 10 days. As a non-limiting example, period may be 30 days. As a non-limiting example, period may be 45 days. As a non-limiting example, period may be 89 days. As a non-limiting example, period may be 90 days.

With continued reference to FIG. 1, autoregressive signal processing module 152 may be configured to receive at least one directional momentum signal 140 and a temporal coefficient 156. A "temporal coefficient," for the purposes of this disclosure, is a value is used in and sets temporal restrictions on autoregressive signal processing module. As a non-limiting example, temporal coefficient 156 may include a period for an EMA, or a value k used in the calculation of EMA above. In some embodiments, a temporal coefficient may include a number of coefficients used in an autoregressive formula.

With continued reference to FIG. 1, autoregressive signal processing module 152 and/or autoregressive filter may include a triple exponential moving average (TEMA). TEMA may be calculated using the following formula:

$$TEMA = 3*EMA_1 - 3*EMA_2 + EMA_3$$

Where $EMA_1$ is an EMA, $EMA_2$ is the EMA of $EMA_1$, and $EMA_3$ is the EMA of $EMA_2$.

With continued reference to FIG. 1, in some embodiments, autoregressive signal processing module 152 and/or autoregressive filter may include a double exponential moving average. In some embodiments, autoregressive signal processing module 152 and/or autoregressive filter may include a quadruple exponential moving average.

With continued reference to FIG. 1, an autoregressive filter may include one or more filter taps. A "filter tap," for the purposes of this disclosure, is a coefficient used in a filter. In some embodiments, autoregressive filter may include 2 filter taps. In some embodiments, autoregressive filter may include 3 filter taps. In some embodiments, autoregressive filter may include 4 filter taps. In some embodiments, autoregressive filter may include 1-10 filter taps.

With continued reference to FIG. 1, autoregressive filter, momentum filter, and/or any other filter mentioned in this disclosure may be implemented using software or hardware components depending on the application required. Hardware filters may include components such as resistors, capacitors, inductors, op amps, and the like. These components may be assembled to attain the desired filtering performance. As a non-limiting example, a capacitor may be used as high-pass filter.

With continued reference to FIG. 1, autoregressive signal processing module 152 is configured to determine at least one filtered momentum signal 148 as a function of the at least one directional momentum signal 140 and the temporal coefficient 156. In some embodiments, filtered momentum signal 148 may be determined by inputting directional momentum signal 140 and temporal coefficient 156 into an autoregressive filter as disclosed above. In some embodiments, a TEMA may be calculated for directional momentum signal 140 using temporal coefficient 156 to determine filtered momentum signal 148.

With continued reference to FIG. 1, autoregressive signal processing module 152 may be further configured to receive a second temporal coefficient. In some embodiments, second temporal coefficient may be larger than temporal coefficient 156. As a non-limiting example, temporal coefficient 156 may be 30 days, whereas second temporal coefficient may be 90 days. A person of ordinary skill in the art would appreciate, after having reviewed the entirety of this disclosure that a variety of second temporal coefficients may be chosen. In some embodiments, autoregressive signal filter may be configured to determine a second filtered momentum signal as a function of the at least one directional momentum signal and the second temporal coefficient. In some embodiments, second filtered momentum signal may be used to create dynamic vector as described below.

With continued reference to FIG. 1, the application of autoregressive signal processing module 152 and momentum processing module 144 may allow input signal 120 to be reduced to a filtered momentum signal 148 from which a dynamic vector 160 can be produced. This is particularly useful because input signal 120 may include a non-stationary process. Non-stationary processes are notoriously hard to analyze. This novel application of autoregressive signal processing module 152 and momentum processing module 144 allows for the analysis of unstable processes. Without this application the conclusions enabled by dynamic vector may be arcane and impossible to deduce. Additionally, the use of display data structure allows for these deductions to be presented to users in an organized manner. Particularly, the use of event handlers, allows for the data structure to respond to changes in dynamic vector 160 to change what is to be displayed.

With continued reference to FIG. 1, various filter parameters of autoregressive filter and/or momentum filter may be determined using one or more machine-learning modules. As a non-limiting example, filter parameters may include coefficient weights, number of taps, temporal coefficient 156, and the like. In some embodiments, a filter machine-learning model may be used to tune filter parameters. In some embodiments, filter machine-learning model may be trained using filter training data. Filter training data may include correlations between directional momentum signals, filter parameters, and filtered momentum signals. As a non-limiting example, feedback may be used to train a filter machine-learning model. For example, real-world data may be used to evaluate the accuracy of filtered momentum signal. For example, a high value for a filtered momentum signal may indicate beneficial economic conditions. If filtered momentum signal indicates beneficial economic conditions, but real-world (later collected) data bears out that economic conditions were negative, or neutral, this set of data may be removed from training data, assigned a lesser weight, or the like. In some embodiments, the real-world data may be substituted for the filtered momentum signal and this new correlation may be used to train filter machine-learning model.

With continued reference to FIG. 1, apparatus 100 may be configured to form a dynamic vector 160. As used herein, a "dynamic vector" is a data structure including a measurement of sentiment based on one or more filtered momentum signals or directional momentum signals. Apparatus 100 is configured to generate a display data structure 164 using the at least one filtered momentum signal 148 and a plurality of threshold values 168. For the purposes of this disclosure, a "display data structure," is a data structure that is configured to cause a computing device to display information. Display data structure 164 may include vectors, arrays, hash tables, dictionaries, decision trees, arrays, matrices, and the like. In some embodiments, display data structure 164 may include one or more instances of code for execution on a computing device, such as a remote device.

With continued reference to FIG. 1, in some embodiments, generating the display data structure 164 comprises forming a dynamic vector 160 using the at least one filtered momentum signal 148 and a plurality of threshold values 168. In some embodiments, processor 104 may compare filtered momentum signal 148 to plurality of threshold values 168. In some embodiments, processor 104 may compare a datum from filtered momentum signal 148 to plurality of threshold values 168. As a non-limiting example, threshold values 168 may include upper and lower threshold values. As a non-limiting example, if datum from filtered momentum signal 148 is below a lower threshold, dynamic vector 160 may include a sentiment of "bad," "negative," "bear" or the like. As a non-limiting example, if datum from filtered momentum signal 148 is above an upper threshold, dynamic vector 160 may include a sentiment of "good," "positive," "bull" or the like. In some embodiments, the datum from filtered momentum signal 148 that is used in the comparison may be the latest (in time) datum within filtered momentum signal 148.

Still referring to FIG. 1, in some embodiments, threshold value 168 may include one or more dynamic boundary values. In some embodiments, computing device 116 may determine pair of dynamic boundary values. In some embodiments, pair of dynamic boundary values may be determined as a function of a volatility of a set of historical time-series sequences. A set of historical time-series sequences may include, for example, historical time-series sequences with attributes that are similar to a time-series sequence 124 of interest. In a non-limiting example, if time-series sequence 124 is associated with a value of a particular stock, then a set of historical time-series sequences may include recent data on stocks of similarly sized companies in the same industry. Non-limiting examples of methods of measuring volatility include finding a variance, a standard deviation, a standard deviation over a mean, an average change over a certain time period, and the like. In some embodiments, data relating to historical time-series sequences may be normalized, such as by expressing all changes in value as percent changes. In some embodiments, computing device 116 may identify one or more dynamic boundary values as a function of a volatility of a set of historical time-series sequences. In a non-limiting example, if a set of historical time-series sequences is highly volatile, then dynamic boundary values may be set such that only large changes in time-series sequence 124 value leads to a particular dynamic vector 160 result. In another non-limiting example, a dynamic boundary value marking a boundary between a neutral outlook and a positive outlook may be determined as a multiple of a standard deviation, a multiple of a standard deviation over a mean, a multiple of a variance, a multiple of an average daily change, and the like. In a non-limiting example, a positive multiple of a standard deviation of points in time-series sequence 124 within the past year may be used as a first dynamic boundary value, and a second dynamic boundary value may be the first dynamic boundary value multiplied by −1, such that time-series sequences 124 with high standard deviations have a wider margin between the first and second dynamic boundary values than time-series sequences 124 with low standard deviations. In some embodiments, a formula used to determine dynamic boundary values may vary with time-series sequence 124 category. For example, different multipliers may be applied to measures of variance in different industries. In some embodiments, processor may identify dynamic boundary value and/or a variable used to calculate dynamic boundary value in a source such as memory 108, a database, and/or a lookup table.

With continued reference to FIG. 1, selection of boundary values using the volatility of time-series data allows for better selection of boundary values such that a more volatile time-series data is not erroneously classified. Some data may naturally have greater fluctuations, which should be accounted for automatically when selecting boundary values.

Still referring to FIG. 1, in some embodiments, computing device 116 may determine one or more dynamic boundary values using time-series sequence classification model. In some embodiments, time-series sequence classification model may include a classifier. Time-series sequence classification model may be trained on time-series sequence classification model training data. Time-series sequence classification model training data may include example time-series sequences, associated with example dynamic vectors. Time-series sequence classification model training data may be obtained by, in a non-limiting example, gathering estimates of investor sentiment toward a particular financial instrument at a particular time and an associated time-series sequence. In some embodiments, sentiment data may be gathered using a web crawler. Web crawlers are described below. Once time-series sequence classification model is trained, a classification boundary of time-series sequence classification model may be used as dynamic boundary value.

Still referring to FIG. 1, in some embodiments, time-series sequence classification model may be trained on, and may accept as inputs, directional momentum signals 140. For example, time-series sequence classification model training data may include example directional momentum signals, associated with example dynamic vectors.

Still referring to FIG. 1, individual data points within time-series sequence classification model inputs may be associated with example dynamic vectors. For example, in a time-series sequence classification model trained on example time-series sequences, each data point within an example time-series sequence may be associated with an example dynamic vector, rather than the entire time-series sequence being associated with a single example dynamic vector. For example, time-series sequence classification model training data may include an example time-series sequence including a first value at a first point in time and a second value at a second point in time, then the training data may include a first example dynamic vector associated with the first value at the first point in time and the training data may also include a second example dynamic vector associated with the second value at the second point in time. In another example, in a time-series sequence classification model trained on example directional momentum signals, each example directional momentum signal of the directional momentum signals may be associated with an example dynamic vector.

Still referring to FIG. 1, in some embodiments, determining dynamic vector 160 may include inputting into time-series sequence classification model time-series sequence 124 and receiving as an output from time-series sequence classification model at least one dynamic vector 160. In some embodiments, time-series sequence classification model may include a plurality of classification boundaries. In a non-limiting example, time-series sequence classification model may classify time-series sequence 124 into a category of at least 3 categories.

Still referring to FIG. 1, in some embodiments, time-series sequence classification model may be trained on additional factors. For example, time-series sequence classification model training data may include example movement of one or more associated financial instruments. For example, if time-series sequence 124 represents values of debt from an entity that pays out after 5 years, then movement or values of debt from the entity that pays out after 10 years may be indicative of sentiment toward time-series sequence 124 and such similar financial instruments may be included in time-series sequence classification model training data. In this example, time-series sequence classification model may accept as an input values or movement of similar financial instruments. In another example, time-series sequence classification model training data may include example polling data on consumer or investor confidence. In this example, time-series sequence classification model may accept as an input polling data on consumer or investor confidence from the relevant time frame. Similarly, time-series sequence classification model may also take into account inflation data, unemployment data, interest rates, changes in time-series sequence 124 over multiple time frames, analyst ratings of financial instruments, a location of a headquarters of an entity associated with time-series sequence 124, and the like. In this way, time-series sequence classification model may produce one or more classification boundaries that take into account the relevant available information such that dynamic vector 160 may be accurately determined.

Still referring to FIG. 1, in some embodiments, a user may wish to determine dynamic vector 160 as a function of a subset of the above factors. In some embodiments, apparatus 100 may retrieve up to date values for relevant factors in real time. In some embodiments, apparatus 100 may use default values for factors not to be considered. This may allow a more complex dynamic boundary value to be used when values for fewer variables are available. In some embodiments, a plurality of time-series sequence classification models may be trained. In some embodiments, computing device 116 may be configured to identify a particular time-series sequence classification model from a plurality of time-series sequence classification models as a function of user input. In a non-limiting example, a user may input into user interface 136 an instruction to only consider time-series sequence 124 data from within the past year. In this example, a first time-series sequence classification model may accept as an input time-series sequence 124 data from the past year, and a second time-series sequence classification model may accept as an input time-series sequence 124 data from the past 2 years, and dynamic boundary values from the first time-series sequence classification model may be selected.

Still referring to FIG. 1, in some embodiments, a plurality of dynamic vectors 160 may be calculated. This may be done, for example, by inputting different sets of data into one or more time-series sequence classification models. For example, a first time-series sequence classification model may focus on long term performance and may accept time-series sequence 124 from the past 5 years, and a second time-series sequence classification model may focus on short term performance and may accept time-series sequence 124 from the past month. In this example, it may be possible to generate a plurality of dynamic vectors 160 with the same or different values. For example, if time-series sequence 124 has performed well over the past 5 years, but poorly over the past month, then differing dynamic vector 160 values may be produced. In some embodiments, one or more dynamic vectors 160 may be calculated from one or more time-series sequences 124 of a plurality of time-series sequences 124, where the dynamic vectors 160 are calculated from time-series sequences 124 within a certain pecuniary category. A pecuniary category may include, in non-limiting examples, time-series sequences 124 associated with entities in a particular industry, over a certain time frame, or of a certain size. In some embodiments, time-series sequence 124 may be truncated in order to produce a directional momentum signal with a specific time frame and/or a dynamic vector 160 relevant to that time frame. A plurality of time-series sequence 124 truncations may be used in order to produce data with different time frames. In non-limiting examples, time-series sequence 124 may be truncated such that data from the past 20 years, 10 years, 5 years, 2 years, 1 year, 6 months, 3 months, 1 month, 2 weeks, 1 week, or 1 day is retained. In a non-limiting example, a short term directional momentum signal and dynamic vector 160 may use 1 week of time-series sequence 124 data, a medium term directional momentum signal and dynamic vector 160 may use 1 year of time-series sequence 124 data, and a long term directional momentum signal and dynamic vector 160 may use 10 years of time-series sequence 124 data.

Still referring to FIG. 1, in some embodiments, volatility may be handled differently across different time frames. For example, more aggressive data smoothing may be used when determining long term data than short term data. In another example, data may be normalized when determining long term data such that short term volatility, not overall growth, is the primary factor when assessing a standard deviation.

Still referring to FIG. 1, a dynamic vector 160 may be calculated from time-series sequence 124 data that is current or is not current. For example, dynamic vector 160 may be determined as a function of a change in a time-series sequence from a first time point to a second time point, where neither time point is current. This may be done, for example, to identify dynamic vector 160 from the relevant time period. This may allow for comparison of dynamic vector 160 with data from the relevant time period or from after the relevant time period, which may be used to improve processes for determining dynamic vector 160. For example, a plurality of dynamic boundary values may be calculated based on a plurality of sets of time-series sequence classification model training data and resulting dynamic vectors 160 may be compared to sentiment estimates of the relevant time period in order to identify a training data set and/or algorithm that produces the best dynamic boundary values. For example, a plurality of training data sets and/or algorithms may be tested, and data and/or algorithms that are efficient and closely match sentiment estimates may be used. In some embodiments, this process may be automated such that it takes into account predictable releases of data from governments or other sources. In some embodiments, reinforcement learning may be used to improve time-series sequence classification model. A cost function used in such reinforcement learning may be based on, for example, external measurements of sentiment towards a particular time-series sequence and how closely they match a dynamic vector 160 produced using methods described herein.

Still referring to FIG. 1, in some embodiments, apparatus 100 may determine dynamic vector 160 as a function of at least one directional momentum signal and/or at least one dynamic vector 160. In some embodiments, apparatus 100 may determine dynamic vector 160 as a function of one or more directional momentum signals and may aggregate at least one dynamic vector 160 to form dynamic vector 160. As used herein, a "dynamic vector" is a measurement of sentiment based on one or more directional momentum signals. In non-limiting examples, dynamic vector 160 may indicate a bearish sentiment, a neutral sentiment, or a bullish sentiment toward a particular entity, market, or time-series sequence. In some embodiments, dynamic vector 160 may be indicative of sentiment toward an entire market or subset of a market such as a particular stock. In a non-limiting example, time-series sequence 124 may represent a stock price over time, and dynamic vector 160 determined based on time-series sequence 124 may include an assessment of sentiment toward that stock. In some embodiments, dynamic vector 160 may be determined as a function of a plurality of dynamic vectors 160. For example, dynamic vector 160 may estimate sentiment toward a particular cryptocurrency and may be based on a plurality of dynamic vectors 160 which are calculated based on changes in time-series sequence 124 over differing lengths of time. For example, such a plurality of dynamic vectors 160 may include a first dynamic vector 160 calculated based on a change in time-series sequence over the past month, a second dynamic vector 160 calculated based on a change in time-series sequence over the past 6 months, and a third dynamic vector 160 calculated based on a change in time-series sequence over the past 2 years. Dynamic vector 160 may be calculated as a function of a plurality of dynamic vectors 160, such as by a count of how many of them are positive, how many of them are negative, a sum of their values, a weighted sum of their values, or another formula. Dynamic vector 160 may be calculated using fuzzy inferencing techniques. Fuzzy inferencing techniques are described further below. Fuzzy inferencing techniques may be used to make inferences between directional momentum signals within directional momentum signal in order to produce a dynamic vector.

With continued reference to FIG. 1, in some embodiments, generating display data structure 164 comprises applying a continuous mask 172 to dynamic vector 160. For the purposes of this disclosure, a "continuous mask" is a data transformation process that maps dynamic vector to a set of continuous values along a spectrum. In some embodiments, continuous mask 172 may map dynamic vector to a continuum. In some embodiments, continuous mask 172 may map dynamic vector to an angular continuum. In some embodiments, angular continuum may include angles on a continuum of 0-90 degrees. In some embodiments, angular continuum may include angles on a continuum of 0-180 degrees. In some embodiments, angular continuum may include angles on a continuum of 0-360 degrees. In some embodiments, dynamic vector 160 may include a value on a range of 0-3, this range may be mapped to an angular continuum with a range of 0-180 degrees. In some embodiments, continuous mask 172 may be retrieved from a database.

With continued reference to FIG. 1, display data structure 164 may include an event handler 176. For the purposes of this disclosure, an "event handler" is a routine that is configured to execute a block of code upon detection of an event. Event handler 176 may alter data within display data structure 164 upon occurrence of an event. In some embodiments, event handler 176 may be triggered by detection of a user input. In some embodiments, event handler 176 may be triggered by detection of a user clicking a button. In some embodiments, event handler 176 may be triggered by detection of a user keyboard input. In some embodiments, event handler 176 may include an event listener. For the purposes of this disclosure, an "event listener" is a program that is configured to detect an event for an event handler. Event listener, as non-limiting example, may detect button presses, elapsed time, keyboard presses, mouse movement, voice commands, and the like.

With continued reference to FIG. 1, display data structure 164 may include an allocation event handler. Allocation event handler may perform various allocations based on dynamic vector 160. "Allocation event handler," for the purposes of this disclosure, is an event handler that is configured to allocate assets. As a non-limiting example, allocation event handler may cause the purchase and or sale of bonds or treasury bills as a function of dynamic vector 160. As a non-limiting example, allocation event handler may cause the purchase and or sale of stocks, mutual funds, or the like as a function of dynamic vector 160. In some embodiments, allocation event handler may be triggered by a change in or update of dynamic vector 160. In some embodiments, allocation event handler may interface with an API in order to carry out allocations as required.

With continued reference to FIG. 1, in some embodiments, display data structure 164 may include a display element 180. A "display element," for the purposes of this disclosure, is a visual element configured to be displayed on a device. Exemplary display elements 180 are further described with respect to FIGS. 6-8. In some embodiments, display element 180 may include a gauge display element. A "gauge display element," for the purposes of this disclosure, is a display element that displays data using a meter orientation. In some embodiments, gauge display element may include a gauge reading element. A "gauge reading element," for the purposes of this disclosure, is a visual element of a gauge display element that indicates a value to a user. As a non-limiting example, the arrow in FIG. 8 may be a gauge reading element. Gauge reading element may include an arrow, a bar, a wedge, a dot, and the like. In some embodiments, gauge reading element may be located as a function of dynamic vector. In some embodiments gauge reading element may include a gauge reading element orientation. In some embodiments, gauge reading element may be located at a gauge reading element orientation. In some embodiments, gauge reading element orientation may include an angle. In some embodiments, gauge reading element orientation may include an angle between 0-180 degrees. In some embodiments, gauge reading element orientation may be determined from dynamic vector 160. In some embodiments, gauge reading element orientation may be determined from dynamic vector 160. In some embodiments, gauge reading element orientation may be determined from continuous mask 172 as applied to dynamic vector 160. As a non-limiting example, if continuous mask 172 outputs a value of 120 degrees, gauge reading element orientation may be set to 120 degrees. In some embodiments, gauge display element may be configured to display a set of continuous values using the gauge reading element. As a non-limiting example, a gauge reading element may be used to display or point to a particular continuous value in order to display said continuous value.

With continued reference to FIG. 1, in some embodiments, event handler 176 may include a color event handler. A "color event handler," for the purposes of this disclosure is an event handler that is configured to determine a color of a display element as a function of an event. As a non-limiting example, color event handler may be configured to look up a value within dynamic vector in a color look up table, wherein the color look up table relates dynamic vector values to colors. As a non-limiting example, values of 0-1 for dynamic vector may be associated with red. As a non-limiting example, values of 1-3 for dynamic vector may be associated with yellow. As a non-limiting example, values of 3-4 for dynamic vector may be associated with green. In some embodiments, output of continuous mask 172 may be associated colors within a lookup table that may be accessed by color event handler.

With continued reference to FIG. 1, in some embodiments, color event handler may be configured to determine a color using a color mask. A "color mask," for the purposes of this disclosure, is a data transformation process that maps data to a color value. As a non-limiting example, color value may be expressed using RGB value, a hex code, and the like. As a non-limiting example, a low value of dynamic vector 160 may be mapped to a low R value, whereas a high value of dynamic vector 160 may be mapped to a high R value.

With continued reference to FIG. 1, in some embodiments, display data structure 164 may include a temporal element. A "temporal element" for the purposes of this disclosure is an element that indicates a time value. As a non-limiting example, temporal element may include the number of days that dynamic vector has maintained its current category. In some embodiments, temporal element may be a function of a change in dynamic vector; as a non-limiting example, temporal element may include the number of days that a dynamic vector has remained in the same category since a category change. In some embodiments, historical dynamic vectors may be used to calculate temporal element. In some embodiments historical dynamic vectors may be retrieved from a historical data database.

With continued reference to FIG. 1, in some embodiments, display data structure 164 may include a graphical element. A "Graphical element," for the purposes of this disclosure is an element of display data structure 164 that causes a remote device to display a graph. As a non-limiting example, graphical element may include a scatter plot. As a non-limiting example, graphical element may include a histogram. As a non-limiting example, graphical element may include a bar plot. As a non-limiting example, graphical element may include a line graph. As a non-limiting example, graphical element may include a pie chart. In some embodiments, graphical element may include filtered momentum signal 148. As a non-limiting example, graphical element may include threshold values 168. In some embodiments, is may be configured to cause the remote device to display the graphical element, wherein displaying the graphical element comprises overlaying the plurality of threshold values 168 on top of the at least one filtered momentum signal 148. An exemplary embodiment of a displayed graphical element may be found in FIG. 6.

Still referring to FIG. 1, apparatus 100 is configured to transmit display data structure to a remote device 132. Display data structure is configured to cause remote device 132 to display dynamic vector 160. In some embodiments, display data structure be configured to cause remote device 132 to display one or more display elements as disclosed above. Apparatus 100 may configure a remote device 132 to display dynamic vector 160 as a state-indicative visual element through display data structure. In some embodiments, a state-indicative visual element may include a state-indicative representation of a dial. In some embodiments, computing device 116 may communicate a visual element data structure including a visual element to remote device 132. In some embodiments, display data structure 164 may include a state-indicative visual element.

Still referring to FIG. 1, in some embodiments, a visual element data structure may include a visual element. In some embodiments, a display element may include a visual element. As used herein, a "visual element" is a representation of data that is displayed visually to a user. In some embodiments, a visual element data structure may include a rule for displaying visual element. In some embodiments, a visual element data structure may be determined as a function of dynamic vector 160. In some embodiments, a visual element data structure may be determined as a function of an item from the list consisting of input source 128, input signal 120, time-series sequence 124, time-series sequence classification model training data, one or more attributes of time-series sequence classification model, dynamic boundary value, directional momentum signal, directional momentum signal 140, dynamic vector 160, and dynamic vector 160. In a non-limiting example, a visual element data structure may be generated such that visual element describing or highlighting dynamic vector 160 is displayed to a user. For example, a visual element may include a dial indicating a value of dynamic vector 160.

Still referring to FIG. 1, in some embodiments, visual element may include one or more elements of text, images, shapes, charts, particle effects, interactable features, and the like. For example, a state indicative dial may include text identifying each state on the dial.

Still referring to FIG. 1, a visual element data structure may include rules governing if or when visual element is displayed. In a non-limiting example, a visual element data structure may include a rule causing a visual element describing dynamic vector 160 to be displayed when a user selects dynamic vector 160 using a graphical user interface (GUI).

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more categories and may apply a rule to all data in a category, to all data in an intersection of categories, or all data in a subsection of a category (such as all data in a first category and not in a second category). For example, a plurality of directional momentum signals used to calculate dynamic vector 160 may be treated in the same way. A visual element data structure may rank data or assign numerical values to them. For example, positive dynamic vectors 160 may be shown above negative dynamic vectors 160. A numerical value may, for example, measure the degree to which a first datum is associated with a category or with a second datum. For example, a numerical value indicating how close a directional momentum signal is to a dynamic boundary value. A visual element data structure may apply rules based on a comparison between a ranking or numerical value and a threshold. For example, all directional momentum signals below a dynamic boundary value may be displayed in red text. Rankings, numerical values, categories, and the like may be used to set visual element data structure rules. Similarly, rankings, numerical values, categories, and the like may be applied to visual elements, and visual elements may be applied based on them. For example, a plurality of visual elements may be generated, with importance ratings assigned to each, and only the most important visual elements are displayed.

Still referring to FIG. 1, in some embodiments, visual element may be interacted with. For example, visual element may include an interface, such as a button or menu. In some embodiments, visual element may be interacted with using a user device or remote device such as a smartphone.

Still referring to FIG. 1, in some embodiments, apparatus 100 may transmit visual element data structure to remote device 132. In some embodiments, apparatus 100 may include at least a processor 104 and a memory 108 communicatively connected to the at least processor 104, the memory 108 containing instructions 112 configuring the at least processor 104 to transmit visual element data structure to remote device 132. In some embodiments, visual element data structure may configure remote device 132 to display visual element. In some embodiments, visual element data structure may cause an event handler to be triggered in an application of remote device 132 such as a web browser. In some embodiments, triggering of an event handler may cause a change in an application of remote device 132 such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a visual element data structure may include a string value representing text to be displayed as part of a visual element. In some embodiments, data in a data structure may be organized in a linked list, tree, array, matrix, tenser, and the like. In a non-limiting example, elements of time-series sequence 124 data may be organized in a list. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, a dynamic boundary value data structure may be read and used to determine dynamic vector 160.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Still referring to FIG. 1, in some embodiments, a variable described herein may be converted into a different form. Data formats may be converted in a variety of ways, such as without limitation, using a speech to text function or using optical character recognition. In some embodiments, a variable described herein may be converted into a different form such that it is in a form appropriate for input into a function. As a non-limiting example, time-series sequence classification model may only accept inputs in a particular format, and time-series sequence 124 may be converted into that format such that it may be effectively input into time-series sequence classification model.

Still referring to FIG. 1, in some embodiments, a web crawler may be used to obtain data such as sentiment data. As used herein, a "web crawler" is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape sentiment data from websites, such as websites commonly visited by investors, social media platforms and networking platforms. In some embodiments, a web crawler may be configured to generate a web query. A web query may include search criteria. Search criteria may include, for example, keywords such as stock tickers, names of entities, and website addresses where relevant data is likely to be found. A web crawler function may be configured to search for and/or detect one or more data patterns. A "data pattern" as used in this disclosure is any repeating forms of information.

Still referring to FIG. 1, in some embodiments, a web crawler may work in tandem with a program designed to interpret information retrieved using a web crawler. As a non-limiting example, a machine learning model may be used to generate a new query as a function of prior search results. As another non-limiting example, data may be processed into another form, such as by using optical character recognition to interpret images of text. In some embodiments, a web crawler may be configured to determine the relevancy of a data pattern. Relevancy may be determined by a relevancy score. A relevancy score may be automatically generated by processor 104, received from a machine learning model, and/or received from a user. In some embodiments, a relevancy score may include a range of numerical values that may correspond to a relevancy strength of data received from a web crawler function. As a non-limiting example, a web crawler function may search the Internet for data related to investor sentiment toward a particular entity. In some embodiments, computing device may determine a relevancy score of data retrieved by a web crawler.

Figure 2:
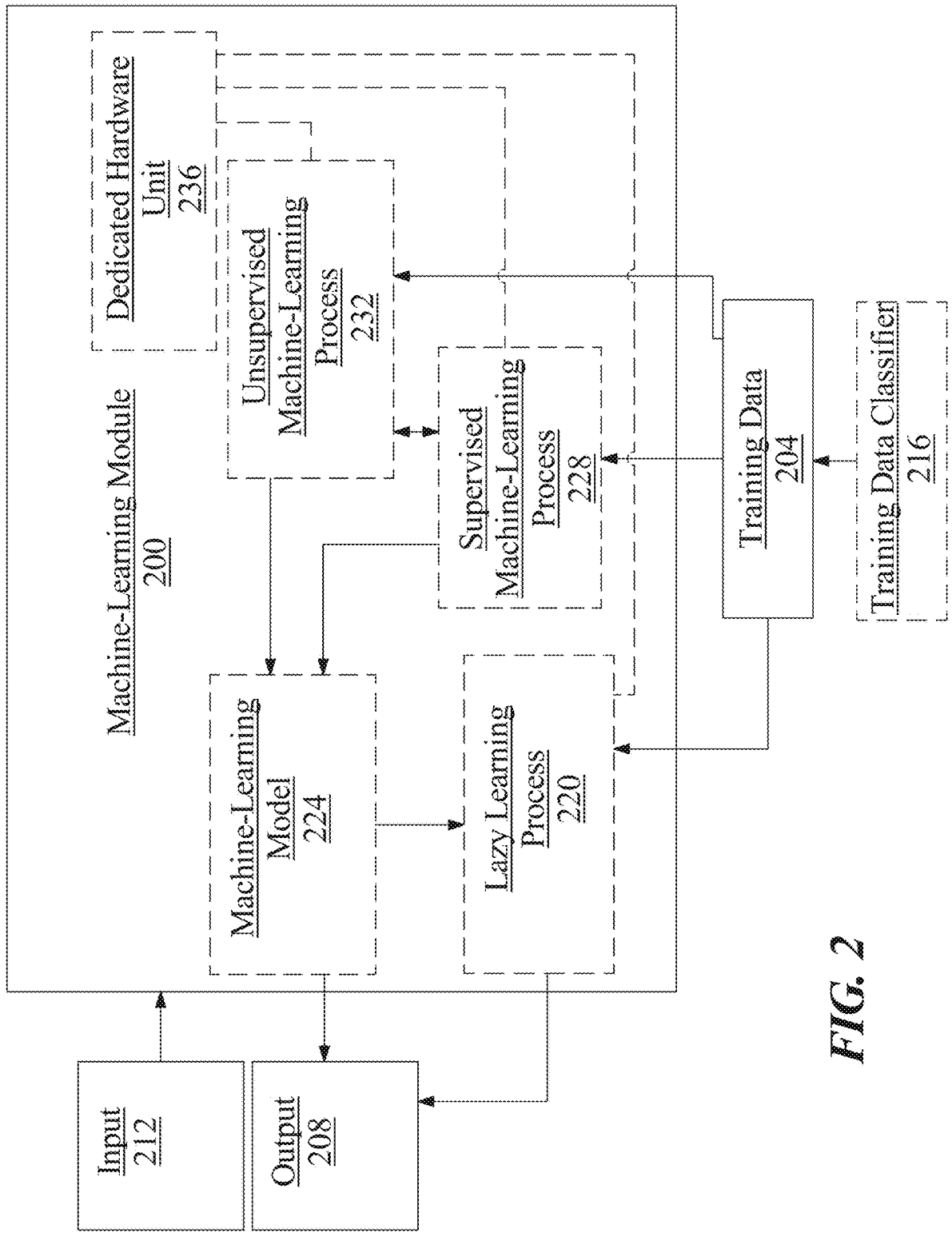
FIG. 2 is a box diagram of an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, time-series sequences 124 may be correlated with dynamic vectors 160.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to a particular industry, financial instrument type, time frame, entity size, and the like.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include time-series sequences 124 as described above as inputs, dynamic vectors 160 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

With continued reference to FIG. 2, apparatus 100 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback.

With continued reference to FIG. 2, in some embodiments, an accuracy score may be calculated for classifier using user feedback. For the purposes of this disclosure, "accuracy score," is a numerical value concerning the accuracy of a machine-learning model. For example, a plurality of user feedback scores may be averaged to determine an accuracy score. In some embodiments, a cohort accuracy score may be determined for particular cohorts of persons. For example, user feedback for users belonging to a particular cohort of persons may be averaged together to determine the cohort accuracy score for that particular cohort of persons and used as described above. Accuracy score or another score as described above may indicate a degree of retraining needed for a machine-learning model such as a classifier; apparatus 100 may perform a larger number of retraining cycles for a higher number (or lower number, depending on a numerical interpretation used), and/or may collect more training data for such retraining, perform more training cycles, apply a more stringent convergence test such as a test requiring a lower mean squared error, and/or indicate to a user and/or operator that additional training data is needed.

Figure 3:
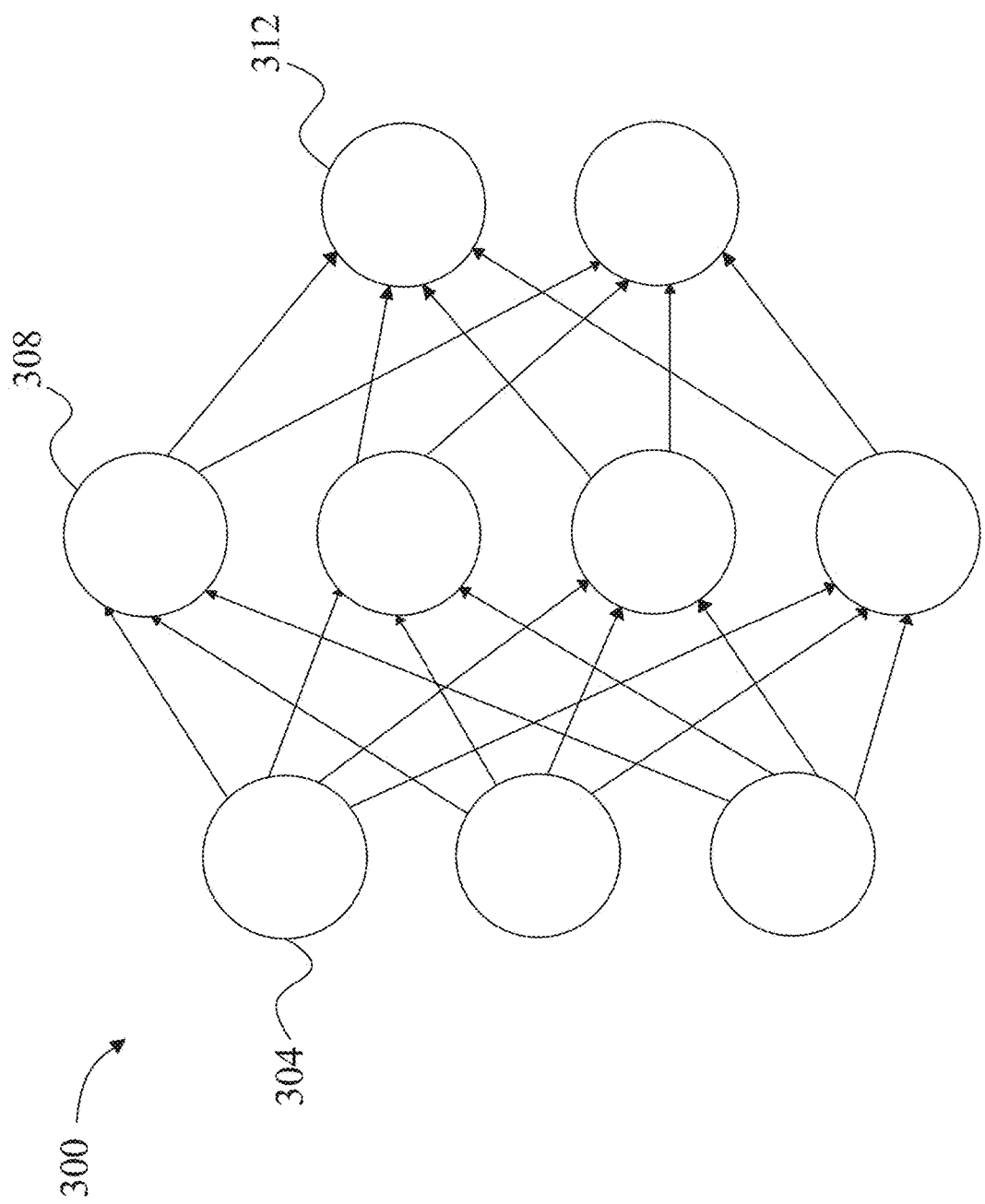
FIG. 3 is a diagram of an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
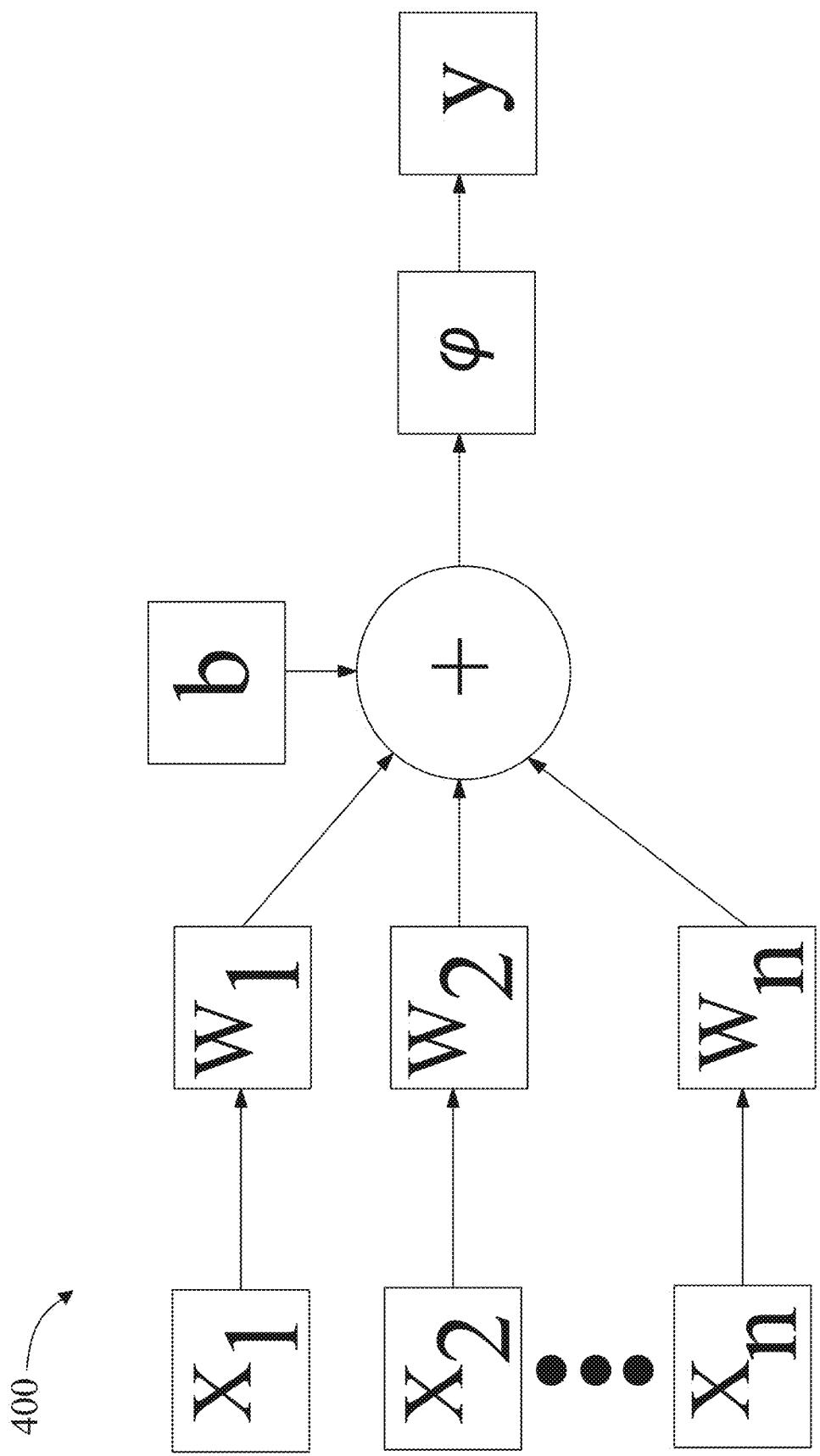
FIG. 4 is a diagram of an exemplary neural network node.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $ƒ(x)=\tanh^2(x)$, a rectified linear unit function such as $ƒ(x)=\max(0, x)$, a "leaky" and/or "parametric" rectified linear unit function such as $ƒ(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $ƒ(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or an "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 4, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 4, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 5:
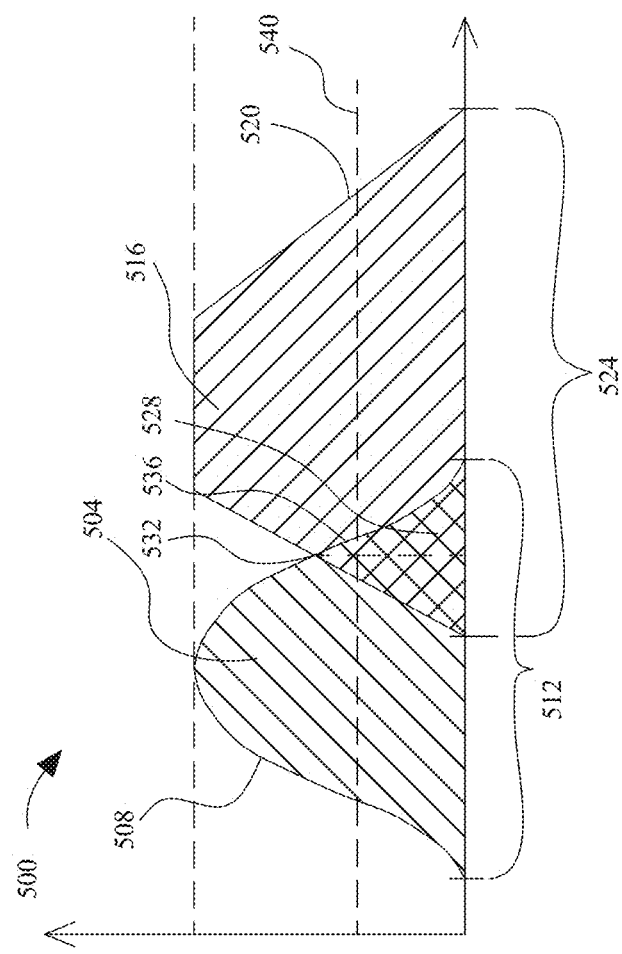
FIG. 5 is a diagram of an exemplary fuzzy inferencing system.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, dynamic vector 160, and a predetermined class, such as without limitation of dynamic vector 160. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or dynamic vector 160 and a predetermined class, such as without limitation dynamic vector 160 categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify a dynamic vector 160 with dynamic vector 160. For instance, if a dynamic vector 160 has a fuzzy set matching dynamic vector 160 fuzzy set by having a degree of overlap exceeding a threshold, processor 104 may classify the dynamic vector 160 as belonging to the dynamic vector 160 categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a dynamic vector 160 may be compared to multiple dynamic vector 160 categorization fuzzy sets. For instance, dynamic vector 160 may be represented by a fuzzy set that is compared to each of the multiple dynamic vector 160 categorization fuzzy sets; and a degree of overlap exceeding a threshold between the dynamic vector 160 fuzzy set and any of the multiple dynamic vector 160 categorization fuzzy sets may cause processor 104 to classify the dynamic vector 160 as belonging to dynamic vector 160 categorization. For instance, in one embodiment there may be two dynamic vector 160 categorization fuzzy sets, representing respectively dynamic vector 160 categorization and a dynamic vector 160 categorization. First dynamic vector 160 categorization may have a first fuzzy set; Second dynamic vector 160 categorization may have a second fuzzy set; and dynamic vector 160 may have a dynamic vector 160 fuzzy set. processor 104, for example, may compare a dynamic vector 160 fuzzy set with each of dynamic vector 160 categorization fuzzy set and in dynamic vector 160 categorization fuzzy set, as described above, and classify a dynamic vector 160 to either, both, or neither of dynamic vector 160 categorization or in dynamic vector 160 categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, dynamic vector 160 may be used indirectly to determine a fuzzy set, as dynamic vector 160 fuzzy set may be derived from outputs of one or more machine-learning models that take the dynamic vector 160 directly or indirectly as inputs.

Figure 6:
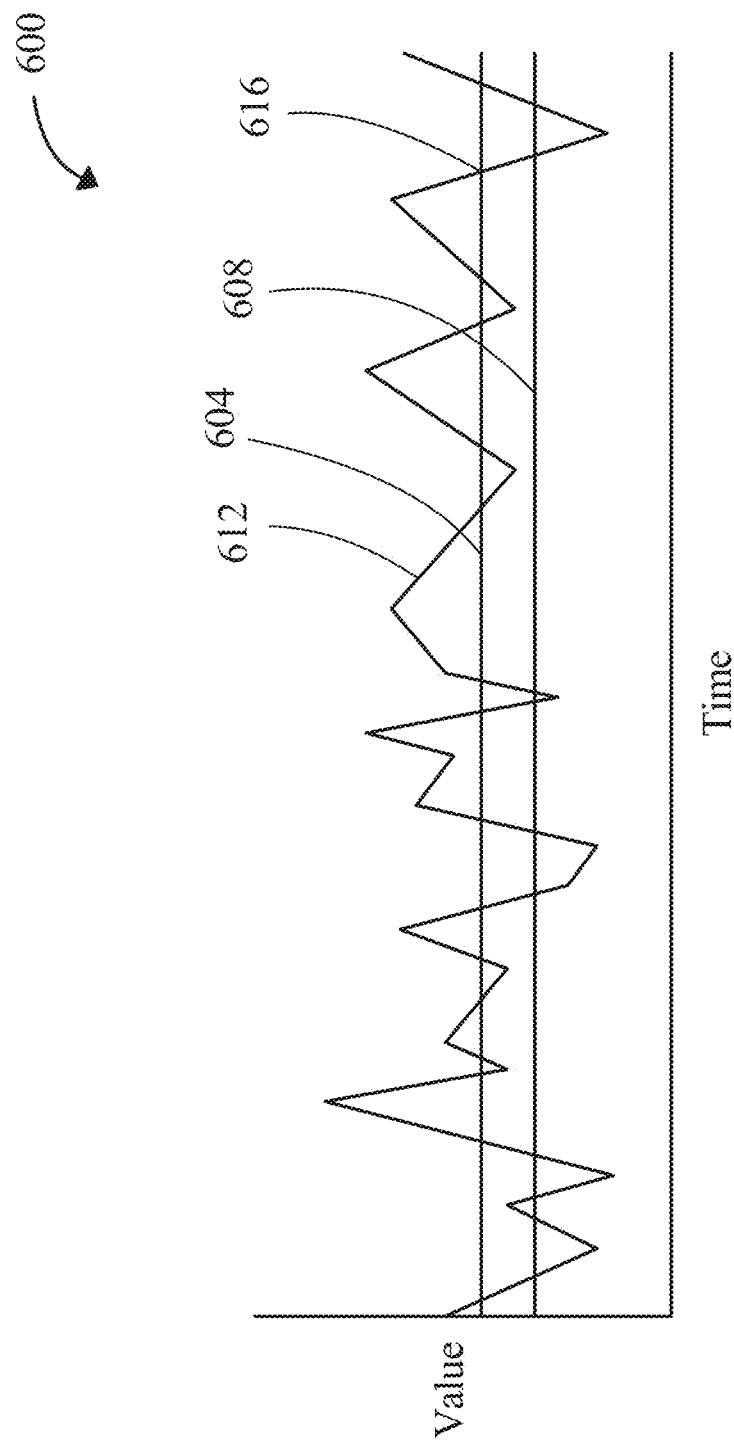
FIG. 6 is a chart depicting directional momentum signals.

Referring now to FIG. 6, an exemplary graph 600 depicting a relationship between directional momentum signals and dynamic boundary values is provided. In some embodiments, graph 600 may be a display element, as described further with respect to FIG. 1. In some embodiments, an upper threshold value 604 and a lower threshold boundary value 608 may be determined. These may be determined as described with reference to FIG. 1. Directional momentum signal 612 may be determined as described with reference to FIG. 1. For example, directional momentum signal 612 may be determined by taking a derivative of a time-series sequence. As shown in FIG. 6, directional momentum signals may be determined for a plurality of time points, for example, in order to create a continuous graph. At locations where directional momentum signal is equal to a threshold value, a value of a dynamic vector calculation may change. For example, at point 616, a dynamic vector calculation may go from positive to neutral.

Referring now to FIG. 7, an exemplary display element 700 is depicted. In some embodiments, a display element may include a view that identifies one or more time frames, and dynamic vectors (PDAV) and/or dynamic vector changes taking place in those time frames. In some embodiments, a display element may include a view that identifies a number of positive dynamic vectors, along with associated dynamic vectors, total days, percent total days, annualized return of an index, and maximum drawdown. In some embodiments, exemplary display element 700 may include one or more temporal elements 704.

With continued reference to FIG. 7, a color event handler, as described above, may operate on one or more of the cells of display element 700 to determine the color of cells. As a non-limiting example, color event handler may be configured to determine the color of "PDAV" cells. For example, "negative" may be mapped to red, "neutral" to yellow, "and "positive" to green. As a non-limiting example, color event handler may be configured to determine the color of "dynamic vector" cells.

Figure 8:
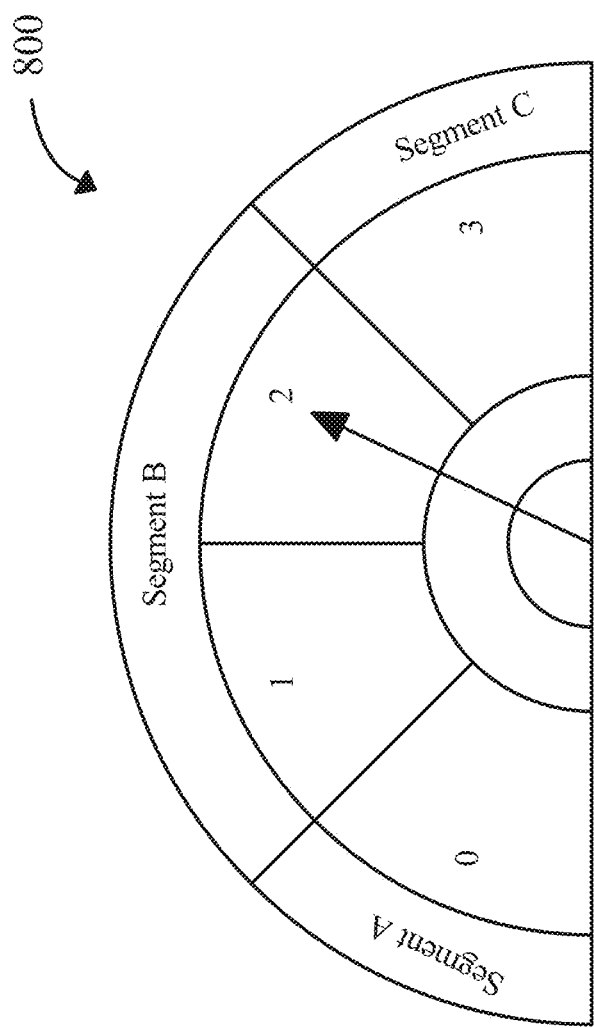
FIG. 8 is a diagram depicting an exemplary display element.

Referring now to FIG. 8, an exemplary gauge display element 800 is depicted. In some embodiments, a display element may include a dial that indicates a state or value of dynamic vector 160. In a non-limiting example, dynamic vector 160 may be calculated by subtracting the number of negative dynamic vectors 160 from the number of positive dynamic vectors 160 from a set of dynamic vectors 160. For example, as shown in FIG. 8, this operation may have a value of 2, and dynamic vector 160 may include a categorization such as a categorization into segment A, segment B, or segment C as in FIG. 8.

Still referring to FIG. 8, in some embodiments, a dial may include one or more color coded regions, such as color coded regions indicating when dynamic vector 160 is in a positive, neutral, or negative state. In some embodiments, color of color coded regions may be determined using a color event handler as described above. In some embodiments, a dial may include an arrow pointing to a region, where a region indicated by an arrow indicates a state of dynamic vector 160. In some embodiments, a dial may include one or more visual effects, including lighting effects, shadows, particle effects, and the like in order to highlight a state of dynamic vector 160. For example, a shadow may be used to draw the eyes away from non-highlighted regions, and a particle effect may be displayed around a highlighted region. In some embodiments, a dial may include one or more animated components. For example, an arrow indicating a state of dynamic vector 160 may move to a different segment of a dial when dynamic vector 160 changes (such as based on new data). In some embodiments, a dial may be displayed alongside one or more interactive components. For example, buttons for refreshing the visual element based on the latest data, and/or displaying a more detailed breakdown of relevant information may be displayed. As another example, a button for accessing a page describing a financial instrument and/or allowing a user to purchase a financial instrument may be displayed alongside a dial associated with the financial instrument. In some embodiments, a plurality of dials may be displayed. For example, dials representing data relevant to each entity in an industry, each entity on an index, or the like may be displayed alongside each other. In some embodiments, dials may be selected and displayed based on dynamic vector 160 or other metrics described herein. For example, dials may be selected based on particularly high or low performing dynamic vectors 160. In some embodiments, dials may be selected and displayed based on attributes of an associated entity, such as a market cap of an associated entity. In some embodiments, dials representing multiple entities may be displayed. For example, a first dial representing a stock of a particular entity may be displayed alongside a second dial representing a market and/or a third dial representing an industry. In some embodiments, dials may move such that they are rearranged, for example, when new data is obtained and new values for variables described herein are calculated.

Figure 9:
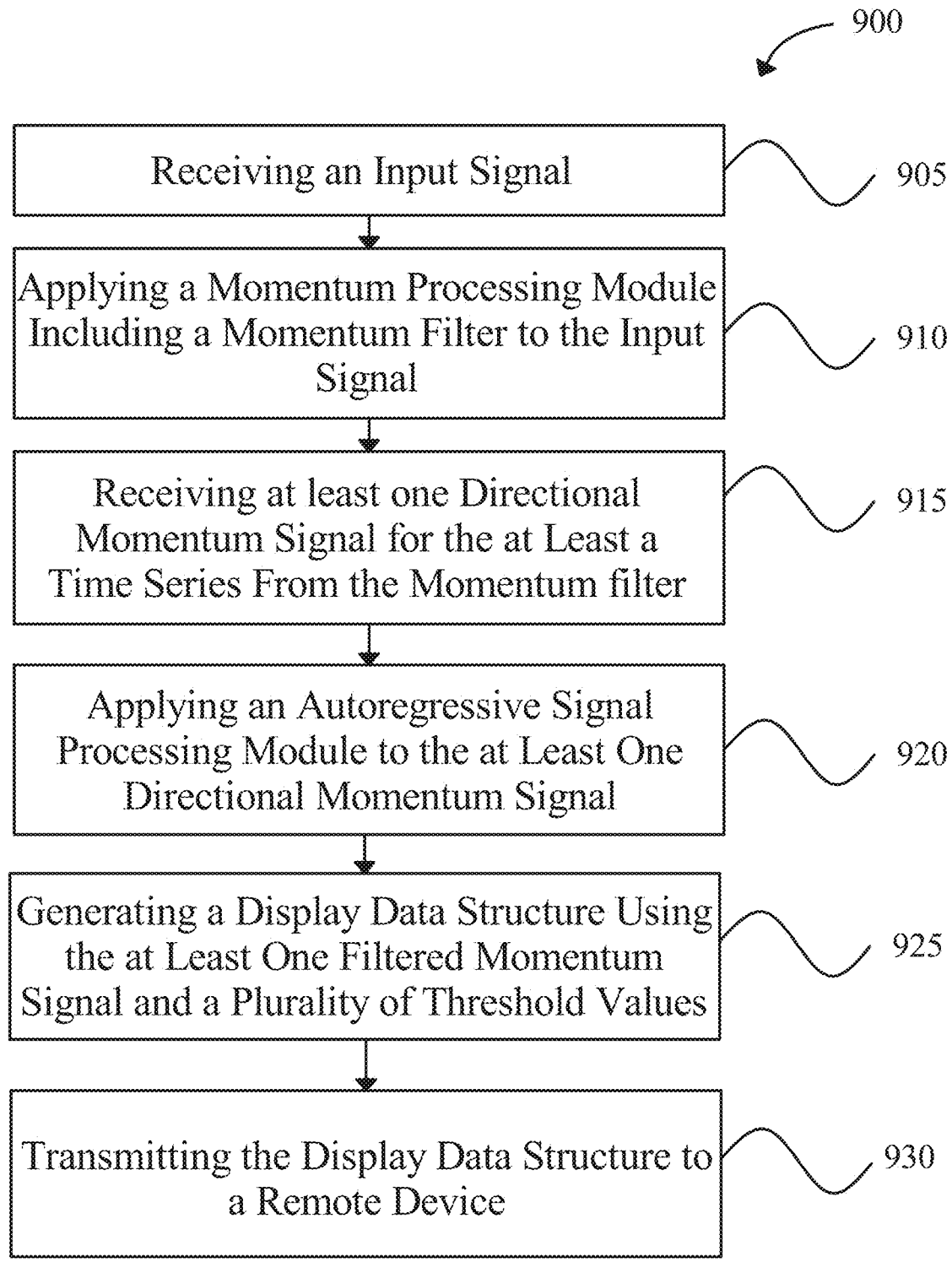
FIG. 9 is a diagram depicting an exemplary method of generating a generating a display data structure from an input signal.

Referring now to FIG. 9, a method 900 of generating a display data structure from an input signal is shown. Method 900 includes a step 905 of receiving, by at least a processor, an input signal, wherein the input signal includes at least a time-series sequence. This may be conducted as disclosed with reference to FIGS. 1-8 above.

With continued reference to FIG. 9, method 900 includes a step 910 of applying, by the at least a processor, a momentum processing module to the input signal. This may be conducted as disclosed with reference to FIGS. 1-8 above.

With continued reference to FIG. 9, method 900 includes a step 915 of receiving, by the at least a processor, at least one directional momentum signal for the at least a time series from the momentum filter. This may be conducted as disclosed with reference to FIGS. 1-8 above.

With continued reference to FIG. 9, method 900 includes a step 920 of applying, by the at least a processor, an autoregressive signal processing module to the at least one directional momentum signal. Applying the autoregressive signal processing module includes receiving the at least one directional momentum signal and a temporal coefficient. Applying the autoregressive signal processing module includes determining at least one filtered momentum signal as a function of the at least one directional momentum signal and the temporal coefficient. In some embodiments, autoregressive signal processing module includes an autoregressive filter wherein the auto regressive filter comprises three filter taps. In some embodiments, applying the autoregressive signal processing module to the at least one directional momentum signal includes receiving a second temporal coefficient, wherein the second temporal coefficient is longer than the first temporal coefficient and determining a second filtered momentum signal as a function of the at least one directional momentum signal and the second temporal coefficient. This may be conducted as disclosed with reference to FIGS. 1-8 above.

With continued reference to FIG. 9, method 900 includes a step 925 of generating, by the at least a processor, a display data structure using the at least one filtered momentum signal and a plurality of threshold values. Generating the display data structure includes forming a dynamic vector using the at least one filtered momentum signal and a plurality of threshold values. In some embodiments, generating the display data structure includes applying a continuous mask to the dynamic vector, wherein the continuous mask is configured to make the dynamic vector to a set of continuous values. In some embodiments, forming the dynamic vector comprises determining a dynamic vector for each time-series sequence associated with a particular category, wherein each time-series sequence of the plurality of time-series sequences is associated with a category. In some embodiments, the display data structure includes a gauge display element, wherein the gauge display element comprises a gauge reading element located at a gauge reading element orientation, wherein the gauge reading element orientation is determined as a function of the dynamic vector. In some embodiments, the gauge display element is configured to display a set of continuous values using the gauge reading element. In some embodiments, display data structure may include a temporal element, wherein the temporal element is a function of a change in the dynamic vector. In some embodiments, the display data structure may include a graphical element, wherein the graphical element includes the at least one filtered momentum signal and the plurality of threshold values. In some embodiments, the display data structure is further configured to cause the remote device to display the graphical element, wherein displaying the graphical element comprises overlaying the plurality of threshold values on top of the at least one filtered momentum signal. This may be conducted as disclosed with reference to FIGS. 1-8 above. In some embodiments, method 900 may include applying a continuous mask to the dynamic vector, wherein the continuous mask is configured to make the dynamic vector to a set of continuous values. This may be conducted as disclosed with reference to FIGS. 1-8 above.

With continued reference to FIG. 9, method 900 includes a step 930 of transmitting, by the at least a processor, the display data structure to a remote device, wherein the display data structure is configured to cause the remote device to display the dynamic vector. This may be conducted as disclosed with reference to FIGS. 1-8 above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
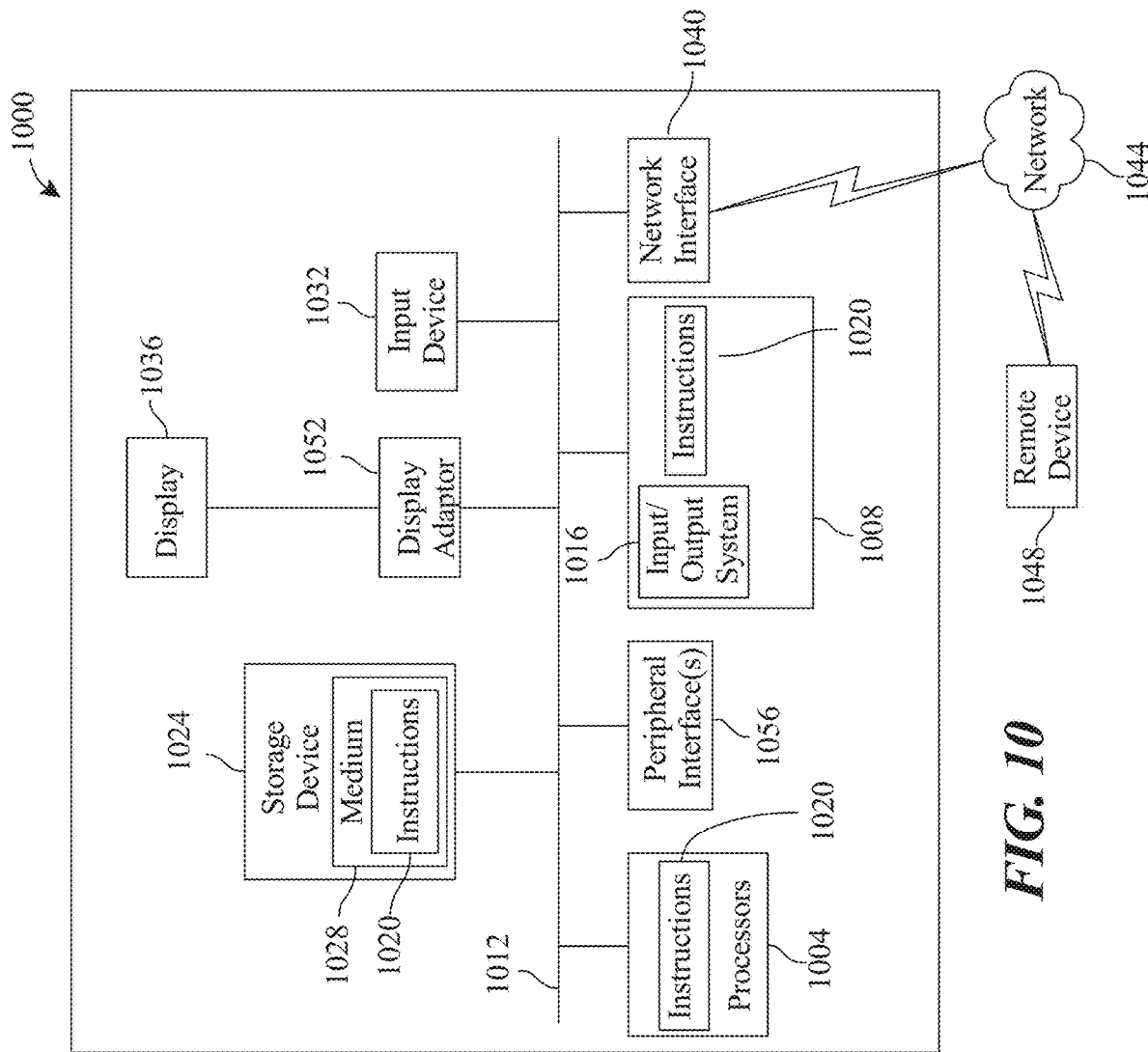
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a display data structure from an input signal, wherein the apparatus comprises:
    at least a processor; and
    a memory communicatively connected to the at least a processor, wherein the memory contains instructions configuring the at least a processor to:
        receive an input signal, wherein the input signal comprises at least a time-series sequence;
        apply a momentum processing module to the input signal;
        receive at least one directional momentum signal for the at least a time series from the momentum processing module;
        apply an autoregressive signal processing module to the at least one directional momentum signal, wherein the autoregressive signal processing module is configured to:
            receive the at least one directional momentum signal and a temporal coefficient; and
            determine at least one filtered momentum signal as a function of the at least one directional momentum signal and the temporal coefficient;
        generate a display data structure using the at least one filtered momentum signal and a plurality of threshold values, wherein generating the display data structure comprises forming a dynamic vector using the at least one filtered momentum signal and a plurality of threshold values; and
        transmit the display data structure to a remote device, wherein the display data structure is configured to cause the remote device to display the dynamic vector.

2. The apparatus of claim 1, wherein generating the display data structure comprises applying a continuous mask to the dynamic vector, wherein the continuous mask is configured to make the dynamic vector to a set of continuous values.

3. The apparatus of claim 1, wherein the dynamic data structure comprises a color event handler, wherein the color event handler is configured to determine a plurality of colors for a plurality of display elements as a function of the dynamic vector.

4. The apparatus of claim 1, wherein forming the dynamic vector comprises determining a dynamic vector for each time-series sequence associated with a particular category, wherein each time-series sequence of the plurality of time-series sequences is associated with a category.

5. The apparatus of claim 1, wherein the display data structure comprises a gauge display element, wherein the gauge display element comprises a gauge reading element located at a gauge reading element orientation, wherein the gauge reading element orientation is determined as a function of the dynamic vector.

6. The apparatus of claim 5, wherein the gauge display element is configured to display a set of continuous values using the gauge reading element.

7. The apparatus of claim 1, wherein the autoregressive signal processing module comprises an autoregressive filter wherein the auto regressive filter comprises three filter taps.

8. The apparatus of claim 1, wherein the display data structure further comprises a temporal element, wherein the temporal element is a function of a change in the dynamic vector.

9. The apparatus of claim 1, wherein:
the display data structure comprises a graphical element, wherein the graphical element comprises the at least one filtered momentum signal and the plurality of threshold values; and
the display data structure is further configured to cause the remote device to display the graphical element, wherein displaying the graphical element comprises overlaying the plurality of threshold values on top of the at least one filtered momentum signal.

10. The apparatus of claim 1, wherein the autoregressive signal processing module is further configured to:
receive a second temporal coefficient, wherein the second temporal coefficient is longer than the first temporal coefficient; and
determine a second filtered momentum signal as a function of the at least one directional momentum signal and the second temporal coefficient.

11. A method of generating a display data structure from an input signal, the method comprising:
receiving, by at least a processor, an input signal, wherein the input signal comprises at least a time-series sequence;
applying, by the at least a processor, a momentum processing module to the input signal;
receiving, by the at least a processor, at least one directional momentum signal for the at least a time series from the momentum filter;
applying, by the at least a processor, an autoregressive signal processing module to the at least one directional momentum signal, wherein applying the autoregressive signal processing module comprises:
receiving the at least one directional momentum signal and a temporal coefficient; and
determining at least one filtered momentum signal as a function of the at least one directional momentum signal and the temporal coefficient;
generating, by the at least a processor, a display data structure using the at least one filtered momentum signal and a plurality of threshold values, wherein generating the display data structure comprises forming a dynamic vector using the at least one filtered momentum signal and a plurality of threshold values; and
transmitting, by the at least a processor, the display data structure to a remote device, wherein the display data structure is configured to cause the remote device to display the dynamic vector.

12. The method of claim 11, wherein generating the display data structure comprises applying a continuous mask to the dynamic vector, wherein the continuous mask is configured to make the dynamic vector to a set of continuous values.

13. The method of claim 11, further comprising determining, using a color event handler, a plurality of colors for a plurality of display elements as a function of the dynamic vector.

14. The method of claim 11, wherein forming the dynamic vector comprises determining a dynamic vector for each time-series sequence associated with a particular category, wherein each time-series sequence of the plurality of time-series sequences is associated with a category.

15. The method of claim 11, wherein the display data structure comprises a gauge display element, wherein the gauge display element comprises a gauge reading element located at a gauge reading element orientation, wherein the gauge reading element orientation is determined as a function of the dynamic vector.

16. The method of claim 15, wherein the gauge display element is configured to display a set of continuous values using the gauge reading element.

17. The method of claim 11, wherein the autoregressive signal processing module comprises an autoregressive filter wherein the auto regressive filter comprises three filter taps.

18. The method of claim 11, wherein the display data structure further comprises a temporal element, wherein the temporal element is a function of a change in the dynamic vector.

19. The method of claim 11, wherein:
the display data structure comprises a graphical element, wherein the graphical element comprises the at least one filtered momentum signal and the plurality of threshold values; and
the display data structure is further configured to cause the remote device to display the graphical element, wherein displaying the graphical element comprises overlaying the plurality of threshold values on top of the at least one filtered momentum signal.

20. The method of claim 11, wherein applying the autoregressive signal processing module to the at least one directional momentum signal further comprises:
receiving a second temporal coefficient, wherein the second temporal coefficient is longer than the first temporal coefficient; and
determining a second filtered momentum signal as a function of the at least one directional momentum signal and the second temporal coefficient.

* * * * *